(12) United States Patent
Tremaine et al.

(10) Patent No.: US 7,576,733 B2
(45) Date of Patent: Aug. 18, 2009

(54) TOUCH SCREEN IMAGE SETTING FRAME

(75) Inventors: Laurence Tremaine, West Warwick, RI (US); Kendall Cowes, Shrewsbury, MA (US); David William Duckworth, North Kingstown, RI (US); Kurt Businger, Warwick, RI (US)

(73) Assignee: Gtech Rhode Island Corporation, Providence, RI (US)

( * ) Notice: Subject to any disclaimer, the term of this patent is extended or adjusted under 35 U.S.C. 154(b) by 835 days.

(21) Appl. No.: 10/890,558

(22) Filed: Jul. 12, 2004

(65) Prior Publication Data

US 2006/0007180 A1 Jan. 12, 2006

(51) Int. Cl.
*G06F 3/041* (2006.01)
(52) U.S. Cl. ............... 345/178; 345/418; 345/428; 248/295.11; 248/918
(58) Field of Classification Search ......... 345/157–167, 345/418, 428, 173–179; 248/295.11, 442.2, 248/918
See application file for complete search history.

(56) References Cited

U.S. PATENT DOCUMENTS

| | | | |
|---|---|---|---|
| 5,313,273 A | 5/1994 | Griffin et al. | |
| 5,381,349 A | 1/1995 | Winter et al. | |
| 5,751,276 A | 5/1998 | Shih | |
| 5,754,259 A * | 5/1998 | Nakamatsu et al. | 348/835 |
| 5,777,898 A | 7/1998 | Teterwak | |
| 6,018,332 A | 1/2000 | Nason et al. | |
| 6,104,384 A | 8/2000 | Moon et al. | |
| 6,124,841 A | 9/2000 | Aoyama | |
| 6,181,328 B1 | 1/2001 | Shieh et al. | |
| 6,326,979 B1 | 12/2001 | Radeztsky | |
| 6,677,958 B2 | 1/2004 | Cottone et al. | |
| 7,318,774 B2 * | 1/2008 | Bryant et al. | 463/25 |
| 2003/0013522 A1 | 1/2003 | Muir | |
| 2003/0222858 A1 * | 12/2003 | Kobayashi | 345/173 |

FOREIGN PATENT DOCUMENTS

| | | | |
|---|---|---|---|
| DE | 92 02 465 | 8/1992 | |
| JP | 06067633 A * | 3/1994 | 345/418 |

OTHER PUBLICATIONS

"Attachment holding mechanism for personal computer monitors", IBM Technical Disclosure Bullentin 37(06B): 639-641, Jun. 1994.
International Search Report dated Feb. 28, 2006, Application No. PCT/US2005/024591, filed Jul. 12, 2005.

* cited by examiner

*Primary Examiner*—Alexander Eisen
*Assistant Examiner*—Christopher E Leiby
(74) *Attorney, Agent, or Firm*—K&L Gates LLP

(57) ABSTRACT

A touch screen image setting frame configured to be placed over a monitor having a touch screen overlay, including an inner perimeter that defines an opening in the touch screen image setting frame, an outer perimeter disposed parallel to the inner perimeter, at least one surface configured to conform to the surface of a monitor, and a device disposed on the touch screen image setting frame and configured to at least temporarily secure the touch screen image setting frame to the front of the monitor, wherein the vertical and horizontal dimensions of the inner perimeter are equal to or adjustable to be equal to the vertical and horizontal dimensions of a touch screen active area of the touch screen overlay, and a method of using the same is disclosed.

24 Claims, 16 Drawing Sheets

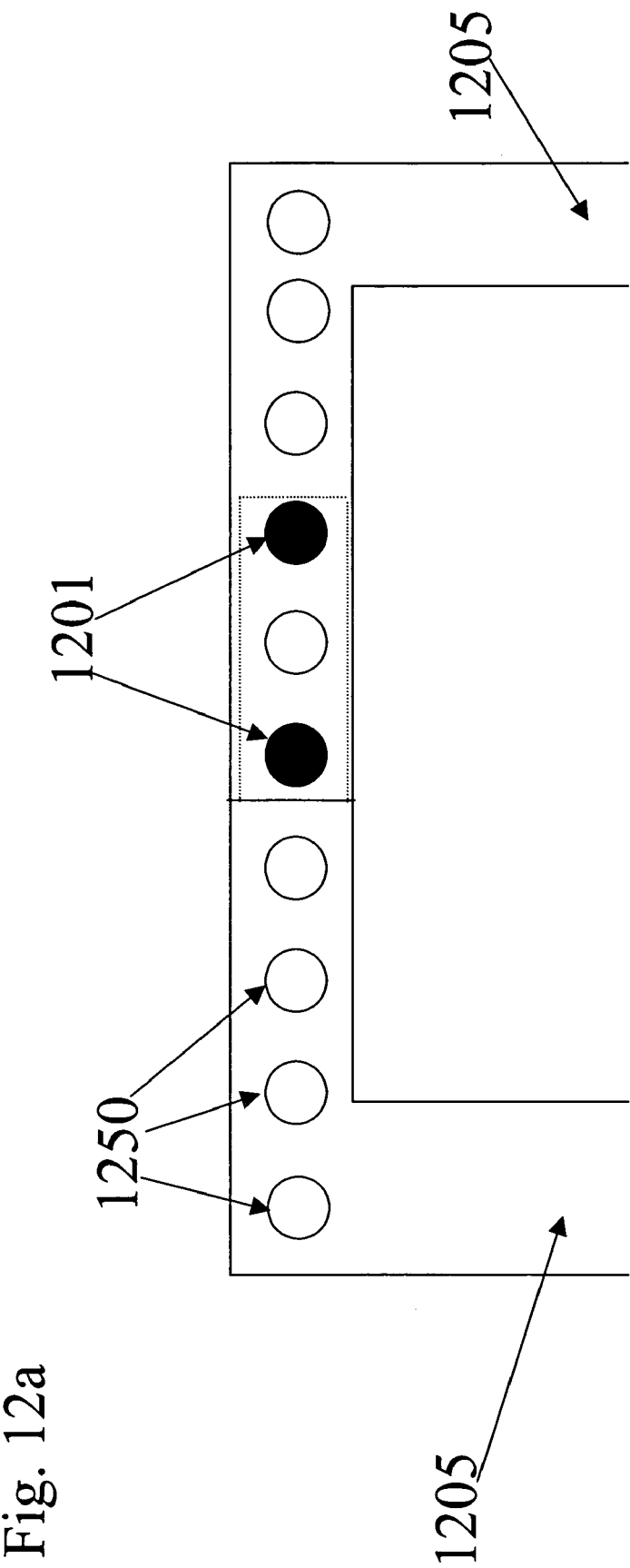

TOUCH SCREEN IMAGE SETTING FRAME

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Touch screens are used in many applications. For example, lottery terminal manufacturers may provide lottery game terminals to retail establishments, such as casinos, gaming centers, and the like. Often, these terminals include monitors that have been modified to include touch screens, which may be easy to use and attractive to some gaming customers. Over time, and as a result of servicing the gaming terminals, the touch screens may exhibit a decrease in precision and may require realignment, resealing and calibration. Component aging may also cause a decrease in precision. Similar adjustments may be needed in other touch screen application areas, e.g. ATMs. ticket dispensers, information kiosks, etc. However, particularly for gaming machines, a well calibrated touch screen is desirable in order to keep a game player's interest and continued play. A well calibrated touch screen also decreases player confusion and frustration.

Different types of touch screens may be used to modify monitors that are lacking touch screen capabilities. For example, 4 or 5 wire resistive touch screens, capacitive touch screens, surface acoustic wave touch screens, near field imaging touch screens, infrared touch screens, or pen/stylus compatible touch screens may be used. The various types of touch screens have associated advantages and disadvantages, such as amount of resolution, susceptibility to interference, and expense. Touch screens may be fitted to a variety of monitors and displays, both analog and digital, such as, cathode ray tube (CRT) monitors, flat square tube monitors, flat panel displays or liquid crystal displays (plasma displays), active or passive matrix displays, or thin film transistor displays. Alternatively, the touch screen components may be integrated into the monitor and/or its associated CPU.

For example, a resistive touch screen may be applied to the front of a monitor. A resistive touch screen may include a conductive layer, a separation layer including a sensor arrangement, and a resistive layer. The touch screen itself may be adhered to the front of the monitor using a transparent adhesive and additional security may be provided with electrical tape. The sensor arrangement within the touch screen may be coupled to devices that facilitate the transfer of information from the touch screen sensor arrangement. For example, a processor, which controls the monitor, may be used. Other devices that may be used include, for example, a controller and a software driver.

When the surface of the resistive touch screen is disturbed, a voltage change occurs in the area of the disturbance. The controller then registers the position of the voltage change as, for example, a set of x and y coordinates. These coordinates are compared to the coordinates of the display, and any appropriate function may then be carried out. For example, the touch coordinates may correspond to a "Select Game" virtual button on the display, in which case, a touch in the area of the button would cause a list of games to appear on the screen.

Over time, the accuracy of the touch screen may diminish due to environmental influences, component aging, misuse, ordinary wear and tear, or accidental damage. Touch screens are also susceptible to electrical noise, or unwanted electrical or electromagnetic energy.

Therefore, the position at which the touch screen is touched may be incorrectly identified as a different position on the touch screen and/or the underlying monitor screen. This may cause the wrong information to be activated on the underlying monitor screen and cause frustration for a user, e.g. the lottery player using a lottery gaming machine.

In order to correct a touch screen which is experiencing inaccuracy or drift, the touch screen may be calibrated. However, improper scaling or alignment may be a cause of touch screen inaccuracy, despite proper calibration techniques. Conventional calibration techniques include using manufacturer provided software programs that require the user to touch and hold several target points on the touch screen in accordance with the calibration software. However, if the active area of the monitor to which the touch screen is applied is improperly scaled, inaccuracies may result. For example, the active area of the touch screen may be smaller than the active area of the monitor, therefore, any subsequent adjustment to the active area of the monitor may cause inaccuracy. It is desirable for any adjustments to the active area of the monitor to be consistent and for the active areas of similarly manufactured gaming terminals to remain within a certain range of sizes, or, ideally, to be uniform. If the active area of the monitor is too small, it may be difficult for some players to see, however, if it is too large, the touch screen become unreliable and some information may not appear at all.

Therefore, the present invention provides a device used to easily and consistently scale the active area of the monitor and a method of using the same.

BRIEF DESCRIPTION OF THE DRAWINGS

FIGS. 12 and 12*a* illustrate example touch screens that are adjustable by pins.

DETAILED DESCRIPTION OF EXAMPLE EMBODIMENTS

Figure 1:
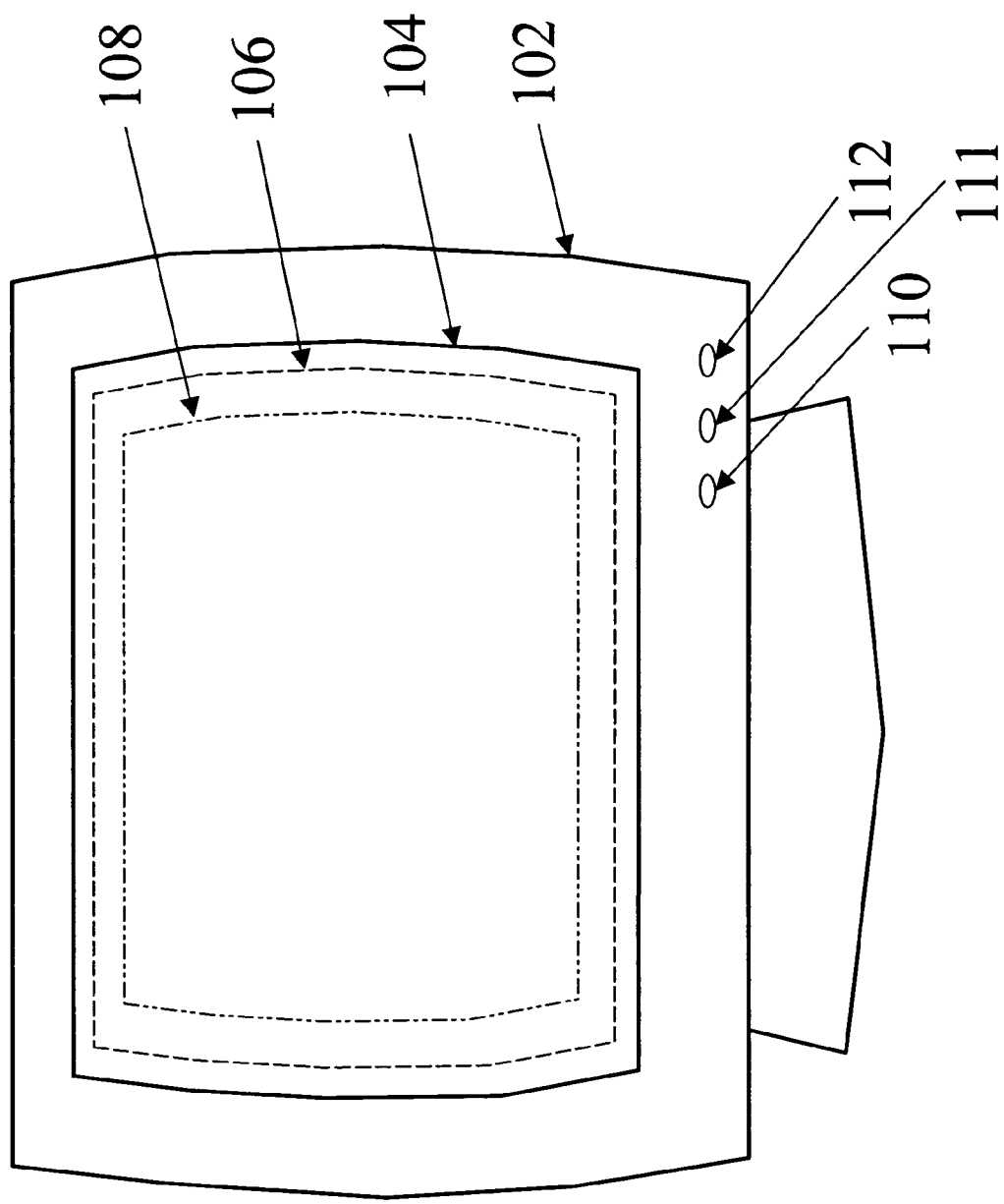
FIG. 1 illustrates an example monitor with a touch screen.

FIG. 1 illustrates an example monitor with a touch screen. The monitor 102 may be any of the above-mentioned type of monitors. According to this exemplary embodiment, a monitor 102 lacking touch screen capabilities may have been fitted with a touch screen overlay 104. The touch screen overlay 104 may have dimensions equal to the full screen dimensions of the monitor 102, according to this example embodiment. Alternatively, the dimensions of the touch screen overlay 104 may be smaller than the full screen dimensions of the monitor 102.

Dashed outline 106 indicates the monitor active area 106. The monitor active area 106 is the area in which command input may be received. The monitor active area 106 may be smaller or larger than the dimensions of the screen itself, generally the active area corresponds to the area where the viewing pixels are illuminated. For a typical monitor, the monitor active area may be surrounded by a black border, into which the cursor does not traverse (for clarity, this border is not indicated in the drawings).

The touch screen active area 108 is the area in which command input may be received on the touch screen overlay 104. The touch screen active area 108 has dimensions smaller than the monitor active area 106, according to this example embodiment. Often this will be the case for touch screens overlays fitted to monitors that do not have touch screen capabilities.

Figure 2:
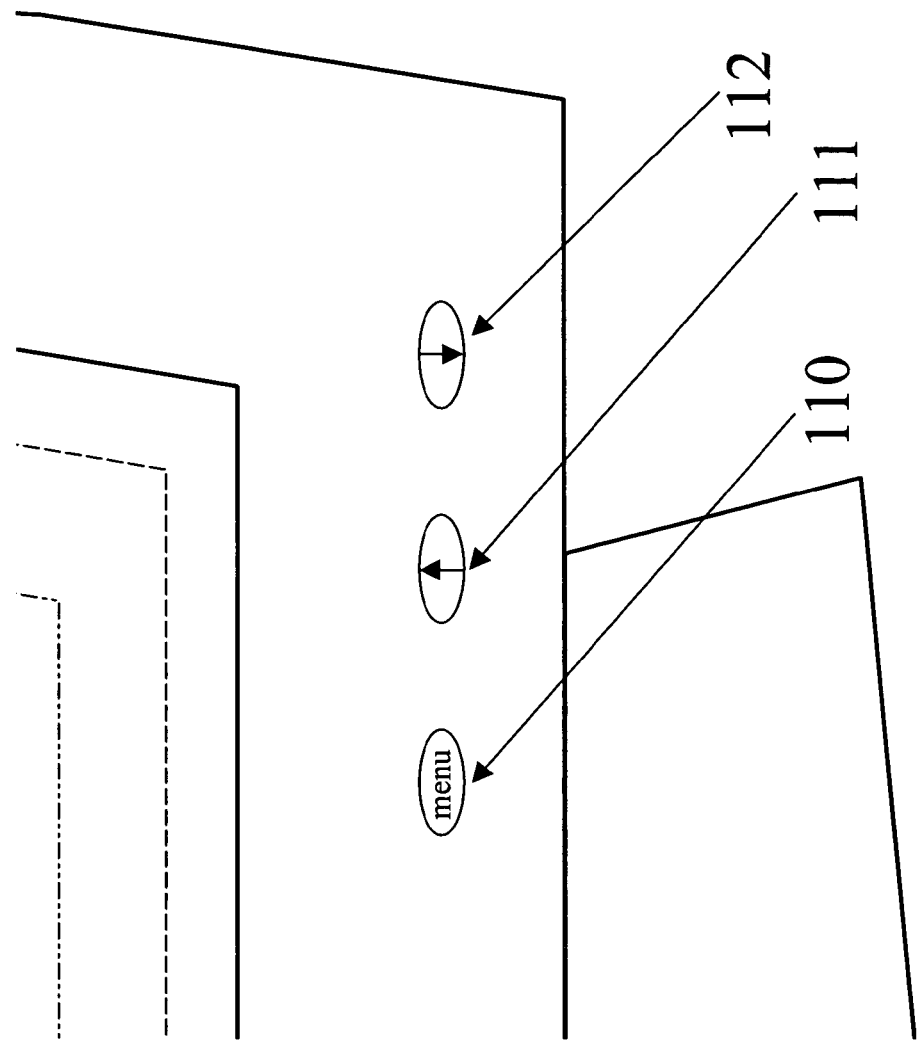
FIG. 2 shows monitor buttons, according to an example embodiment of the present invention.
Figure 3:
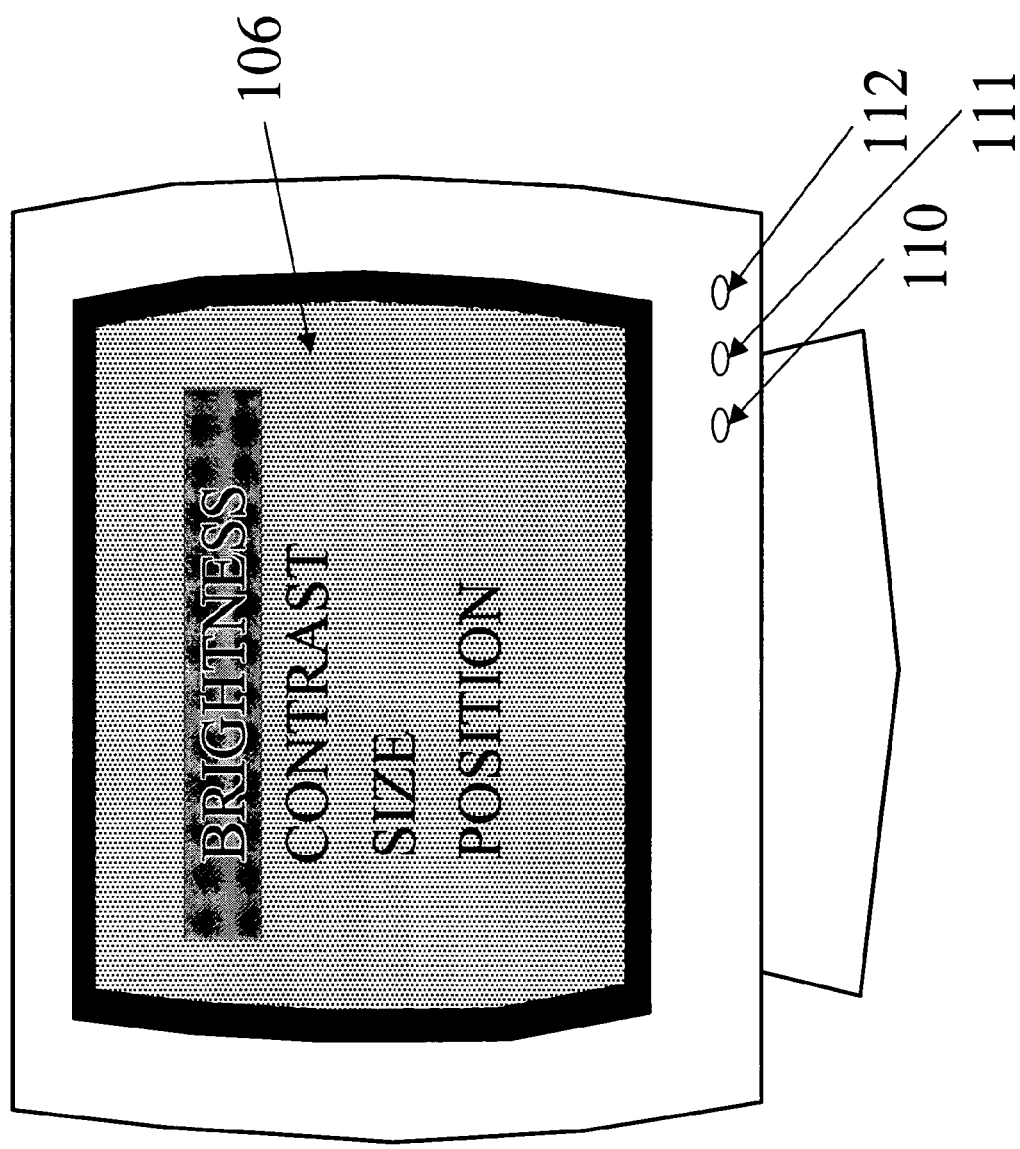
FIG. 3 shows an example parameter menu displayed on the monitor, according to an example embodiment of the present invention.
Figure 4:
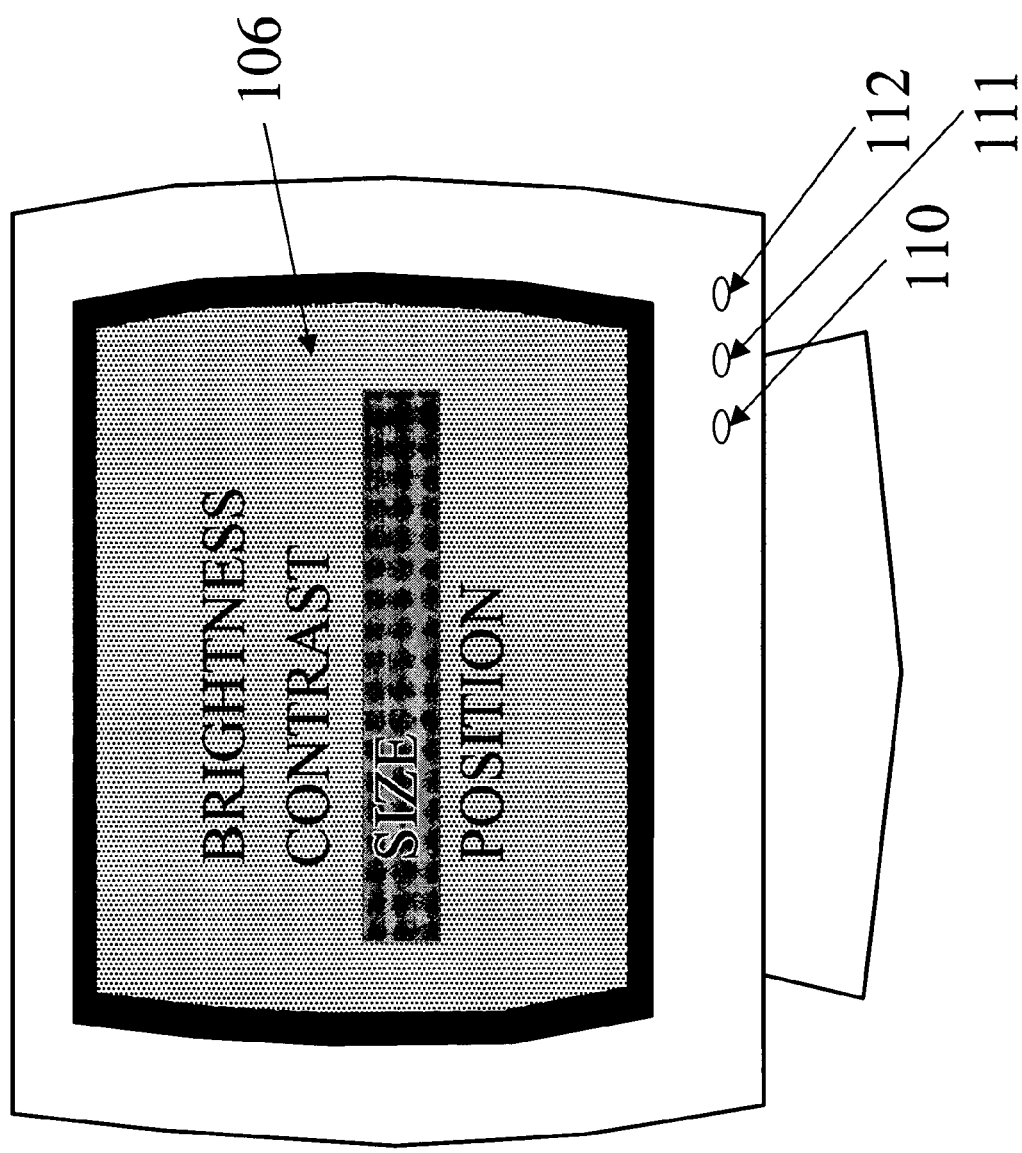
FIG. 4 shows the example parameter menu display of FIG. 3.
Figure 5:
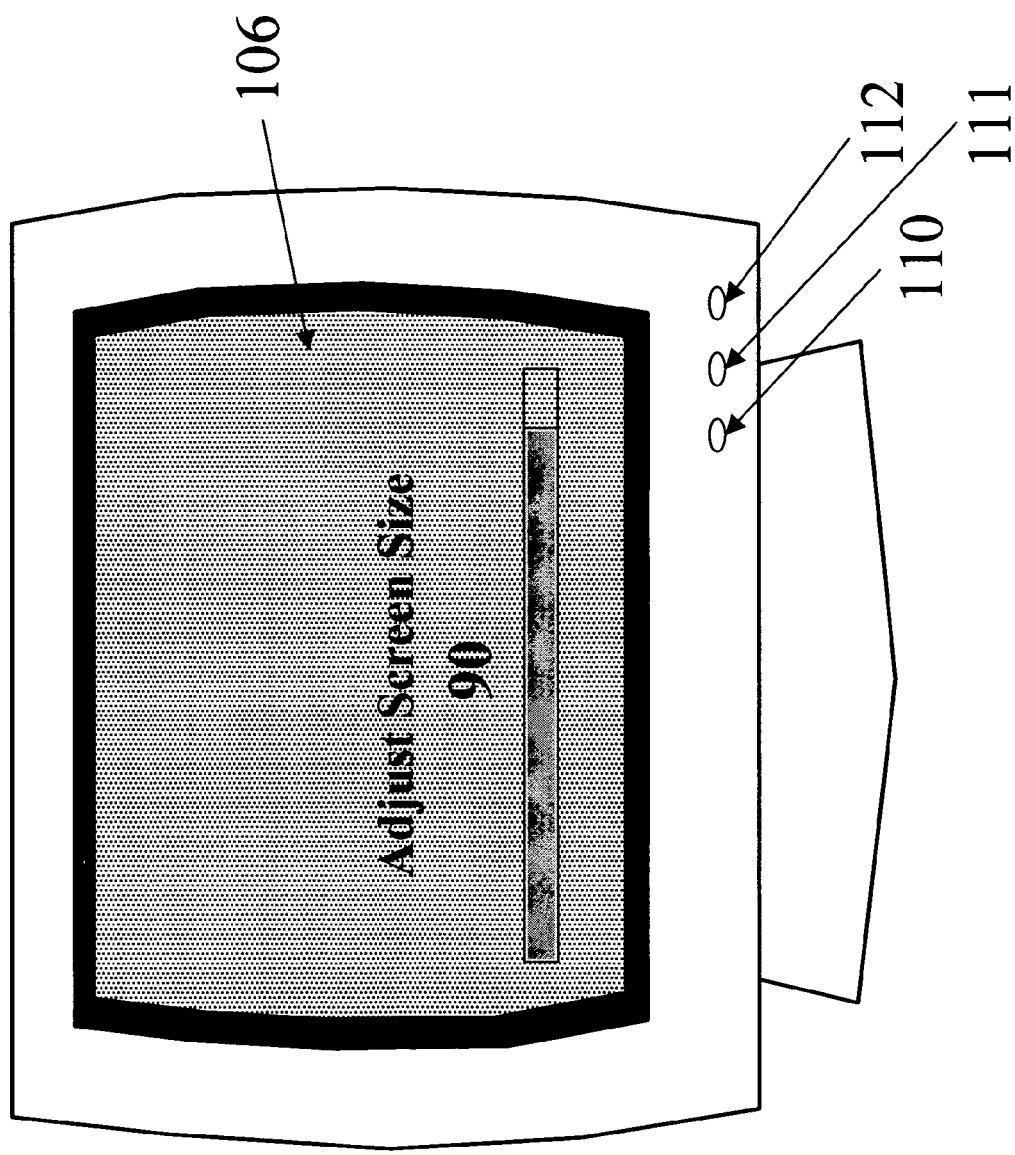
FIG. 5 shows the monitor active area before it has been reduced, according to an example embodiment of the present invention.
Figure 6:
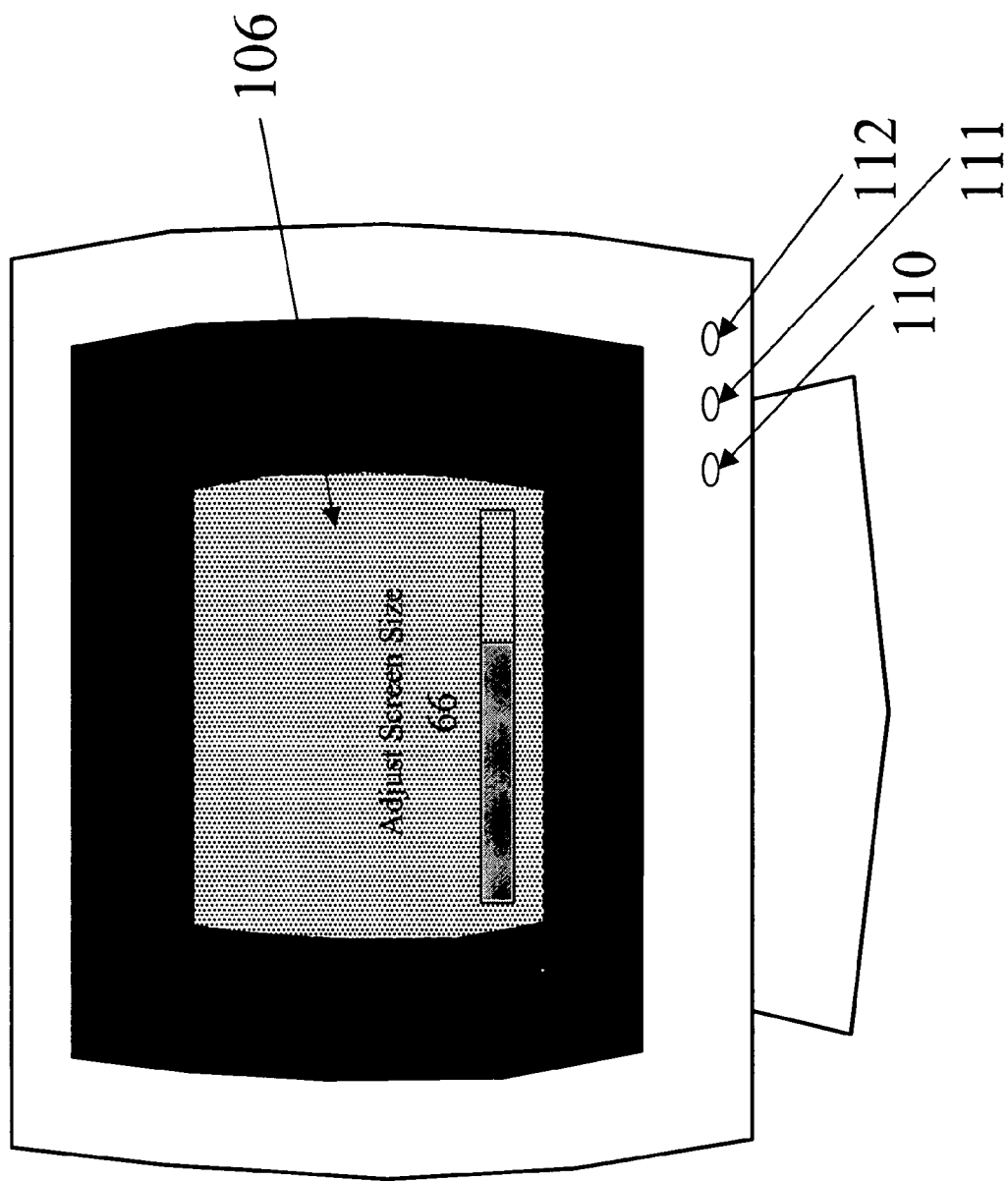
FIG. 6 shows the monitor active area after it has been reduced, according to an example embodiment of the present invention.

FIG. 2 shows monitor buttons, according to an example embodiment of the present invention. Buttons 110, 111, 112 may be used to adjust the size of the monitor active area 106. For example, button 110 may be used to activate a menu displaying a choice of parameters that the user may adjust, as well as to select among those parameters. FIG. 3 shows an example parameter menu displayed on the monitor. In this example embodiment, "BRIGHTNESS," "CONTRAST," "SIZE," AND "POSITION" may be listed when the button 110 is pressed. Button 111 may allow the user to scroll up through the list, as well as increase a selected parameter, and button 112 may be used to scroll down through this list, as well as decrease a selected parameter. FIG. 4 shows the example parameter menu display where the "SIZE" parameter has been selected using 112 until the parameter screen "SIZE" is highlighted and then pressing button 110 in order to select the parameter. The user may increase or decrease the size of the screen using buttons 111 and 112. FIG. 5 shows the monitor active area 106 before it has been reduced, and FIG. 6 shows the monitor active area after it has been reduced. Rather than buttons, any other conventional mechanisms may be employed to reduce and enlarge the size of the monitor active area 106. Additionally, the touch screen may be enabled to display virtual buttons, or other displays to enable the functions described above.

Figure 7:
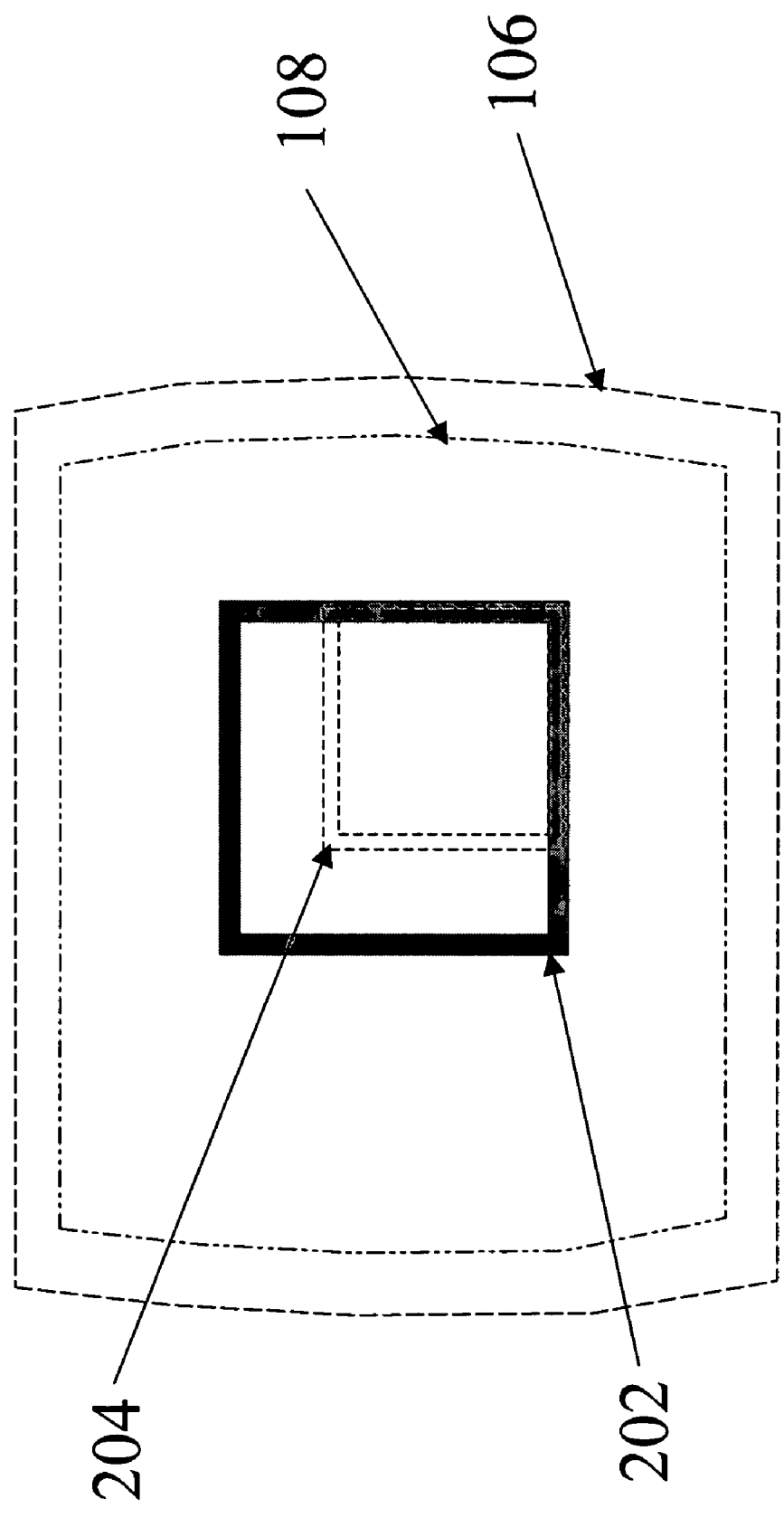
FIG. 7 illustrates an example monitor with a touch screen before the monitor active area has been rescaled.

FIG. 7 illustrates an example monitor with a touch screen before the monitor active area has been rescaled. The monitor active area 106 and the touch screen active area 108 of FIG. 1 are shown here. An object 202 is displayed in monitor active area 106. The corresponding representation of the same object on the touch screen active area 108 is indicated by dashed line 204. Therefore, a user may touch potions of object 202 that do not correspond to any portion of object 204, causing no response, or an unwanted response from the computer system. In order to properly align objects 202 and 204, the monitor active area 106 may be rescaled.

Often, rescaling may be accomplished by a technician simply looking at the size of the monitor active area and adjusting it according to what is visually perceived as a proper scaling. However, this technique may cause inconsistencies between different machines, and in the event of an inexperienced technician, this technique may not result in the most accurate possible resealing.

Figure 8:
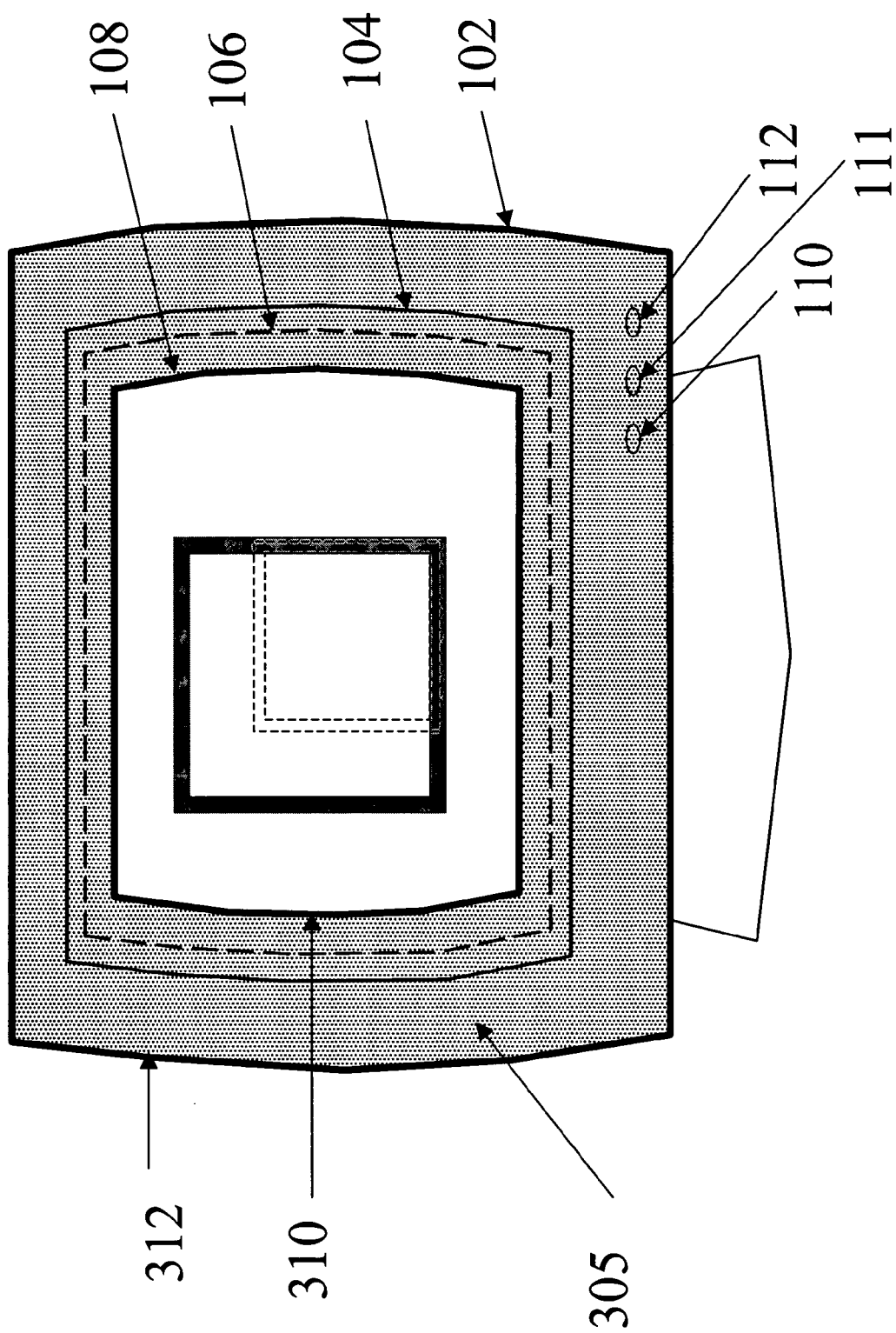
FIG. 8 illustrates an example embodiment of a touch screen image setting frame applied to a monitor, according to an example embodiment of the present invention.
Figure 8A:
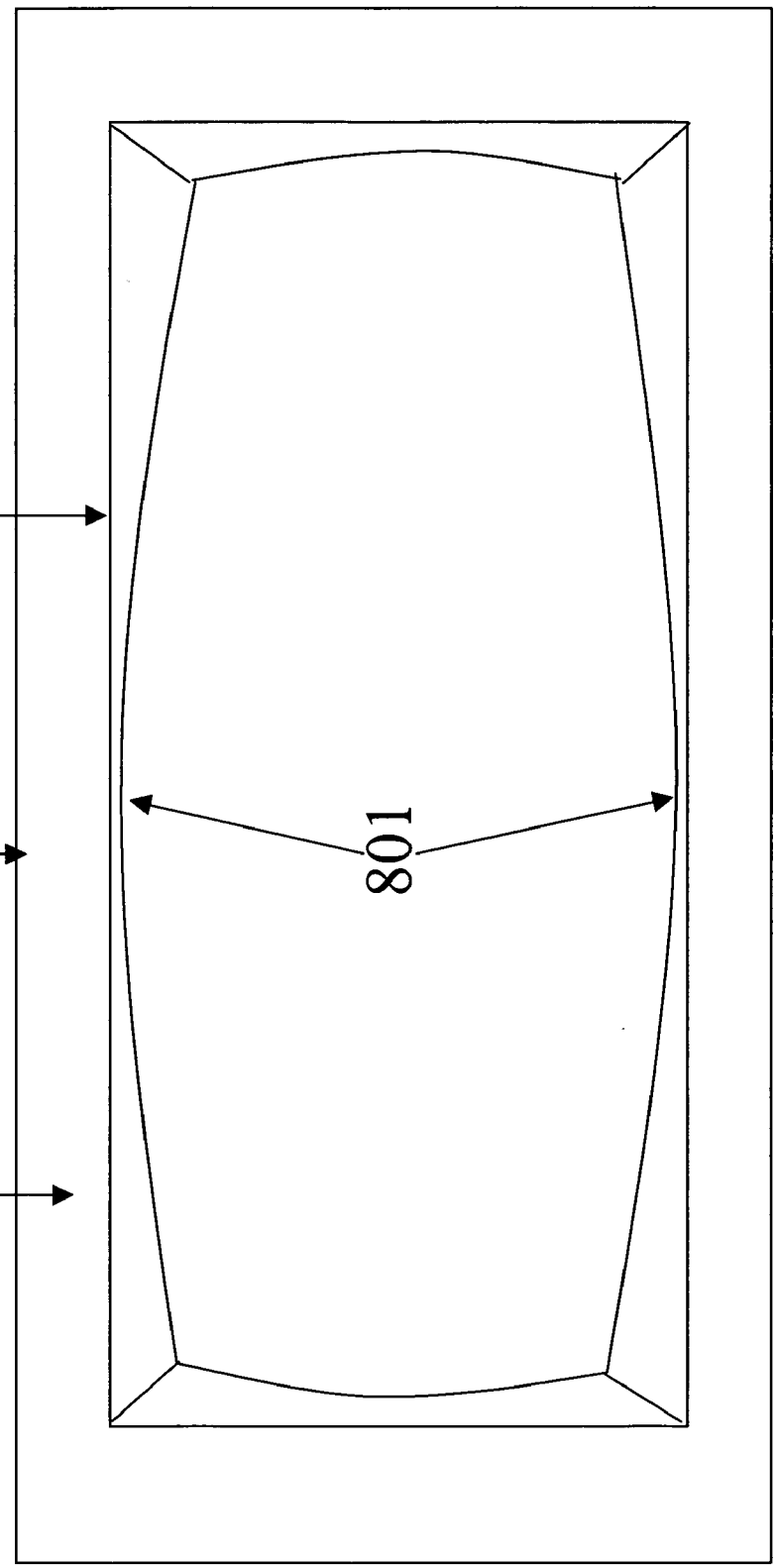
FIG. 8*a* illustrates an example touch screen image setting frame from a top down viewpoint.

FIG. 8 illustrates an example embodiment of a touch screen image setting frame 305 applied to a monitor 102, according to the present invention. FIG. 8a illustrates an example embodiment of a touch screen image setting frame 305 from a top down view. The touch screen frame shown in FIG. 8 is rectangular, but it will be appreciated that the touch screen may come in a variety of different shapes and configurations. The monitor 102, touch screen overlay 104, monitor active area 106, and touch screen active area 108 of FIG. 1 are shown here. Touch screen image setting frame 305 is constructed in a frame format, using a material which may be opaque, partially translucent, or completely translucent, and which includes an inner edge 310 and an outer edge 312. The dimensions of outer edge 312 of touch screen image setting frame 305 may be equal to or greater than the dimensions of touch screen overlay 104. The dimensions of inner edge 310 of touch screen image setting frame 305 may be equal to or smaller than the dimensions of touch screen active area 108.

According to an example embodiment, the dimensions of outer edge 312 of touch screen image setting frame 305 are equal to the dimensions of monitor 102 and the dimensions of inner edge 310 of touch screen image setting frame 305 are equal to the dimensions of touch screen active area 108. It may be advantageous if the inner edge of touch screen image setting frame 305 have the same aspect ratio as the touch screen active area. In this manner, some mechanical or adhesive mechanism may be used to temporarily secure the touch screen image setting frame 305 to the monitor 102. For example, one or more, pins, latches, sections of tape, or velcro tabs may be applied to the edges of the touch screen image setting frame 305 and/or monitor 102, to secure the touch screen image setting frame 305 to the monitor 102.

Figure 12:
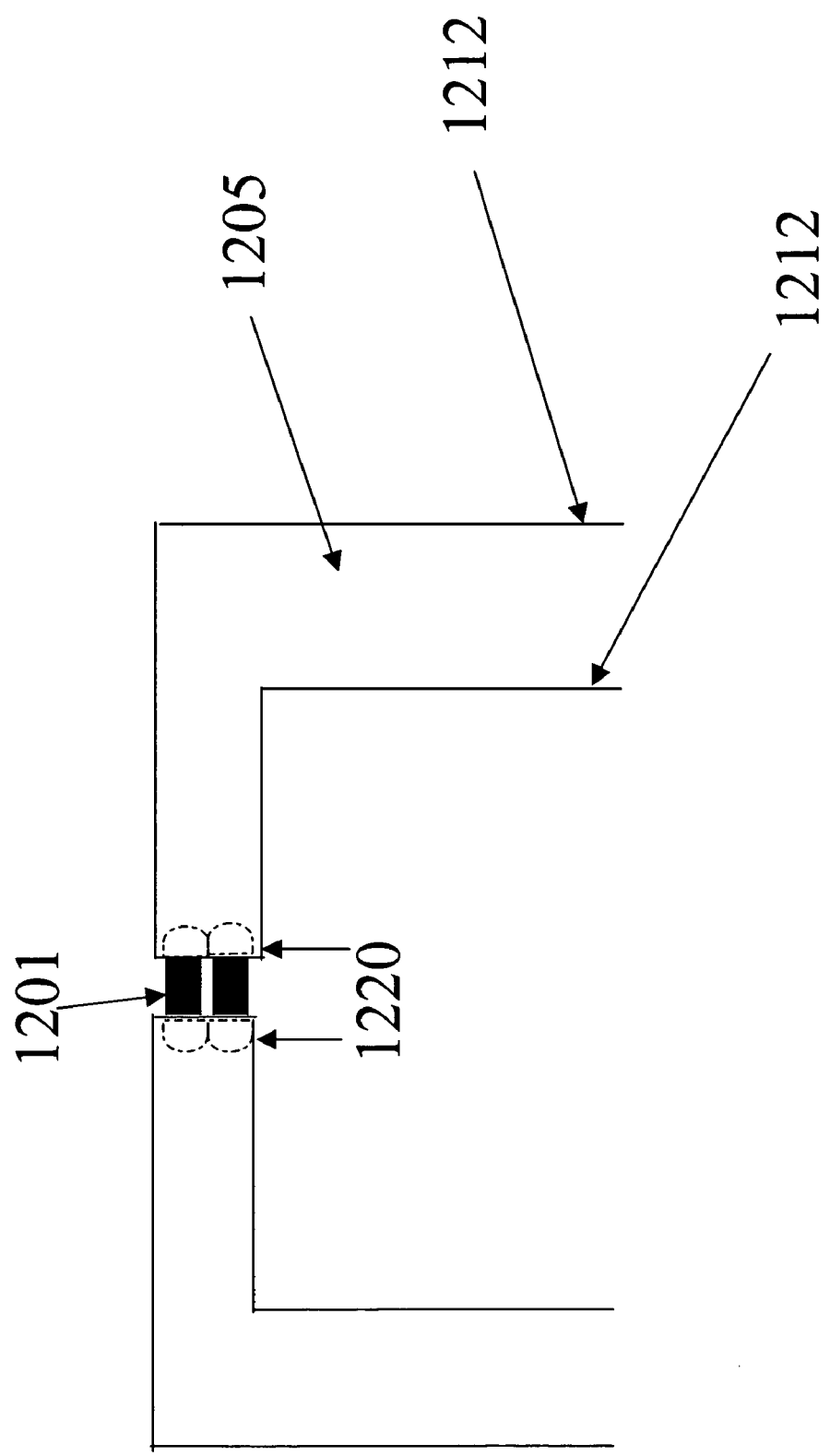
Figure 13:
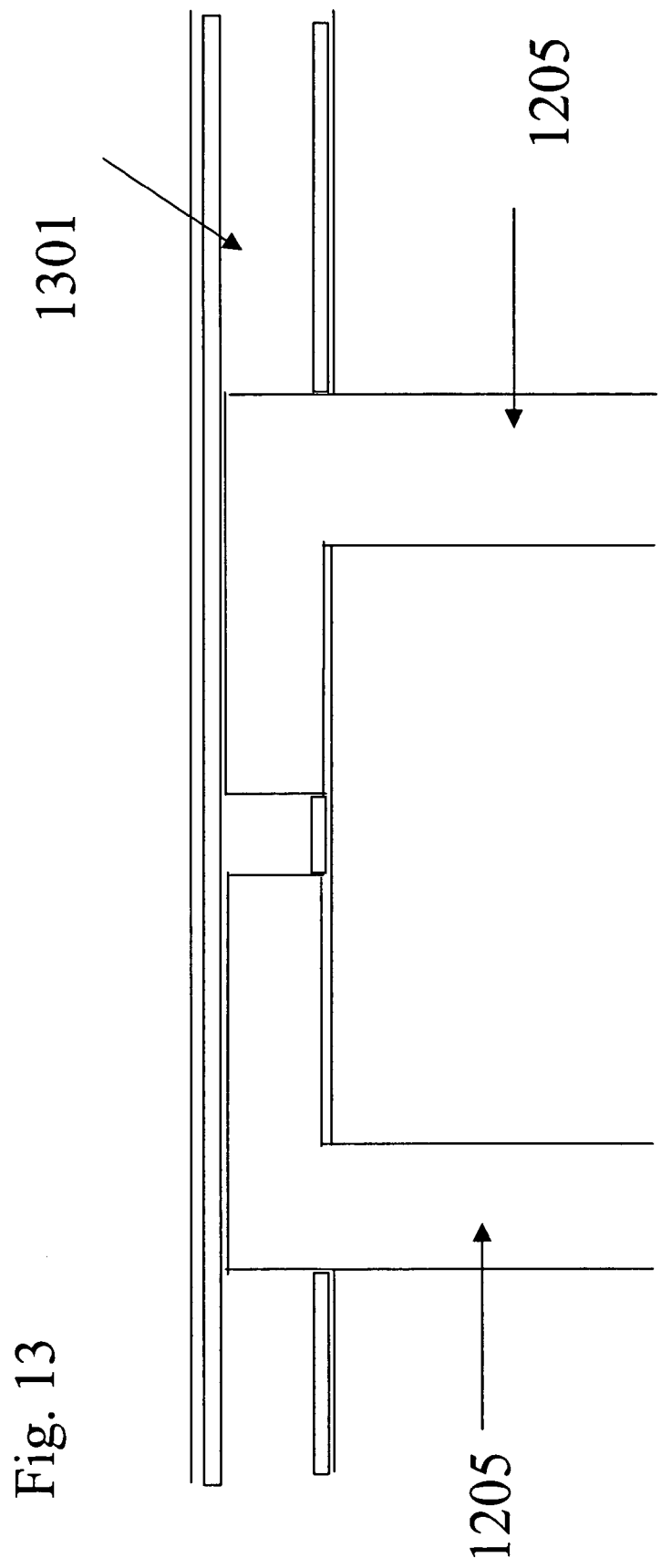
FIG. 13 illustrates an example embodiment of an adjustable touch screen frame on a track.

According to another example embodiment, the touch screen image setting frame 305 may be adjustable. For example, the sides may be designed along tracks along which the sides may move. FIG. 13 illustrates an example embodiment where adjustable frame pieces 1205 are movable inserted on tracks 1301. A stopping or holding mechanism (not shown) hold the adjustable frame pieces 1305 in place. Alternatively, or in combination, a series of pinholes may allow pins to be inserted to connect the sides together at the desired distance apart. FIG. 12 illustrates an example embodiment where adjustable frame pieces 1205 with inner perimeter 1210 an outer perimeter 1212 are connected by pins 1201 to maintain the adjustable frame pieces 1205 the desired distance apart. The pins 1201 are inserted into recessed holes 1220 inside the adjustable frame pieces 1205. The inner perimeter 1210 and outer perimeter 1212 may be adjusted by using pins 1201 of different sizes. Alternately, in FIG. 12a, the frame pieces 1205 may use a series of adjustment holes 1250 and pins 1201 to adjust the frame size, the dotted line representing one frame piece 1205 superimposed over the other. In another example embodiment, the touch screen image setting frame 305 may be made of a material that is at least partially flexible and/or moldable in order to adjust for the size and shape of the of the monitor.

According to another example embodiment, the touch screen image setting frame 305 may have at least one inwardly curved surface so as to accommodate, for example, the outward curve of a CRT monitor. FIG. 8a illustrates an example embodiment of an inwardly curved touch screen frame 305, where curved frame piece 801 shows an inwardly curved surface to accommodate an outward curve of a monitor.

Figure 14:
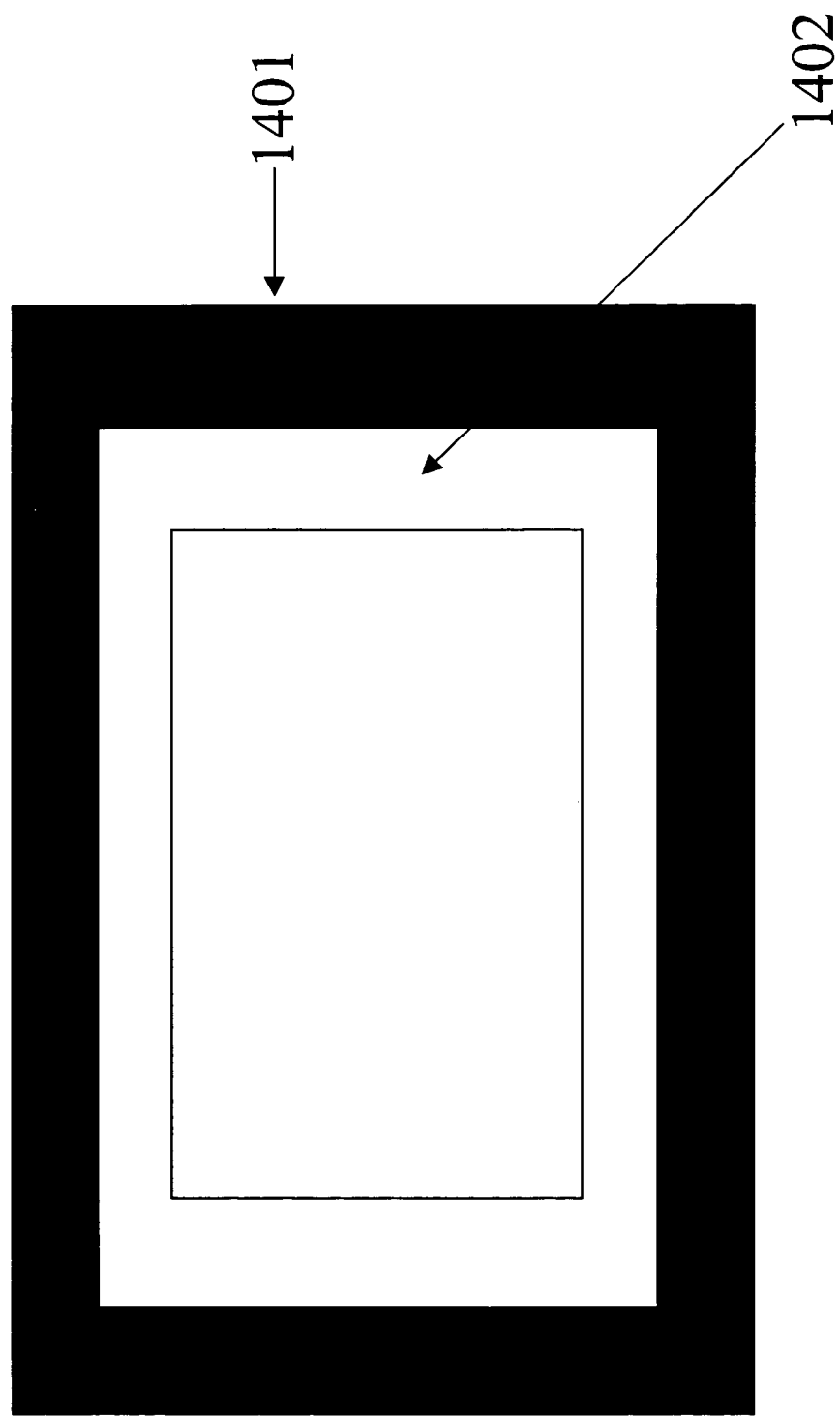
FIG. 14 illustrates an example embodiment of an adjustable touch screen frame comprising concentric frames.

According to another example embodiment, the touch screen image setting frame 305 as shown in FIG. 14 may include at least two concentric frames 1401 and 1402 that may be connected together or taken apart to form a larger or smaller inner edge.

Figure 9:
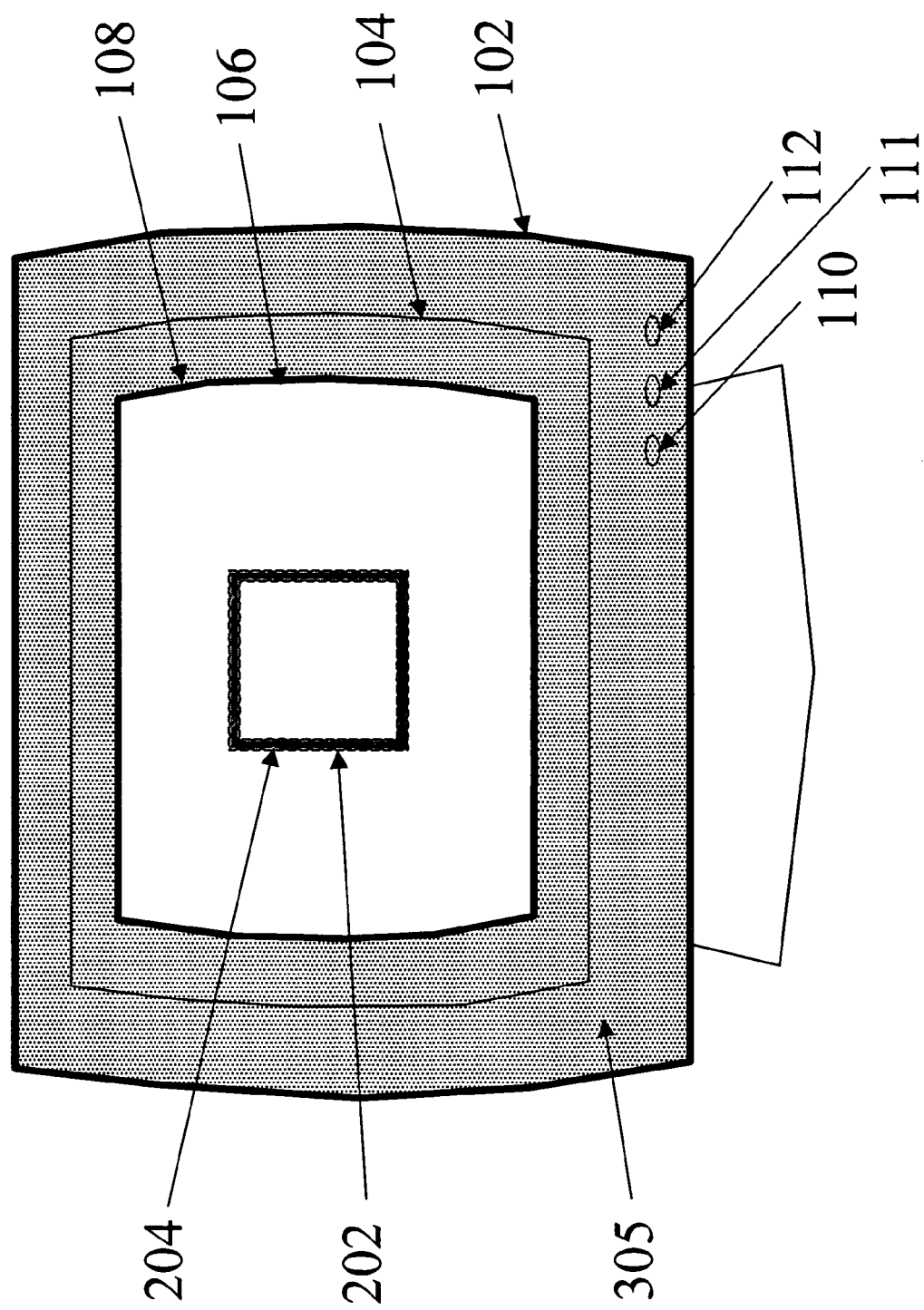
FIG. 9 illustrates an example monitor with a touch screen during rescaling of the monitor active area using the touch screen image setting frame, according to an example embodiment of the present invention.

FIG. 9 illustrates an example monitor with a touch screen during rescaling of the monitor active area using the touch screen image setting frame, according to an example embodiment of the present invention. The monitor 102, touch screen overlay 104, monitor active area 106, and touch screen active area 108 of FIG. 1 are shown here.

The dimensions and position of the monitor active area 106 have been rescaled to match the dimensions and position of the touch screen active area 108, using the touch screen image setting frame 305 as a reference. Accordingly, objects 202 and 204 are properly aligned. The touch screen image setting frame 305, according to the present invention has the advantage that the desired dimensions and positioning of the monitor active area 106 may be quickly and easily calibrated by simply placing the frame over the monitor as shown. The exact dimensions of the touch screen 104 and the touch screen active area 108 are provided by the manufacturer, therefore, the frame may be constructed according to these dimensions, or adjusted accordingly.

Locations that provide lottery gaming terminals which have been modified to include touch screen overlays often perform routine maintenance on several machines at once, or require that even when machines are serviced separately, a uniform appearance is achieved for the machines. For example, at one location there may be 50 machines having the same configuration, that all require an identical calibration of the monitor active area 106. Merely using the same touch screen image setting frame 305 or employing identical frames when servicing the machines will ensure that the calibrations performed are all identical.

Furthermore, the touch screen image setting frame of the present invention ensures that size of the objects displayed on the monitor will not be too large or too small. When objects are too large, accuracy of the touch screen is lost, and object close to the edges of a monitor having a curved screen may be skewed. When object are too small, touching a single object and discerning pictures or text may be too difficult for some users. By shrinking the dimensions of the monitor active area to the dimensions of the touch screen active area, it may be ensured that the monitor active area will not be made too small to be easily viewable.

Figure 10:
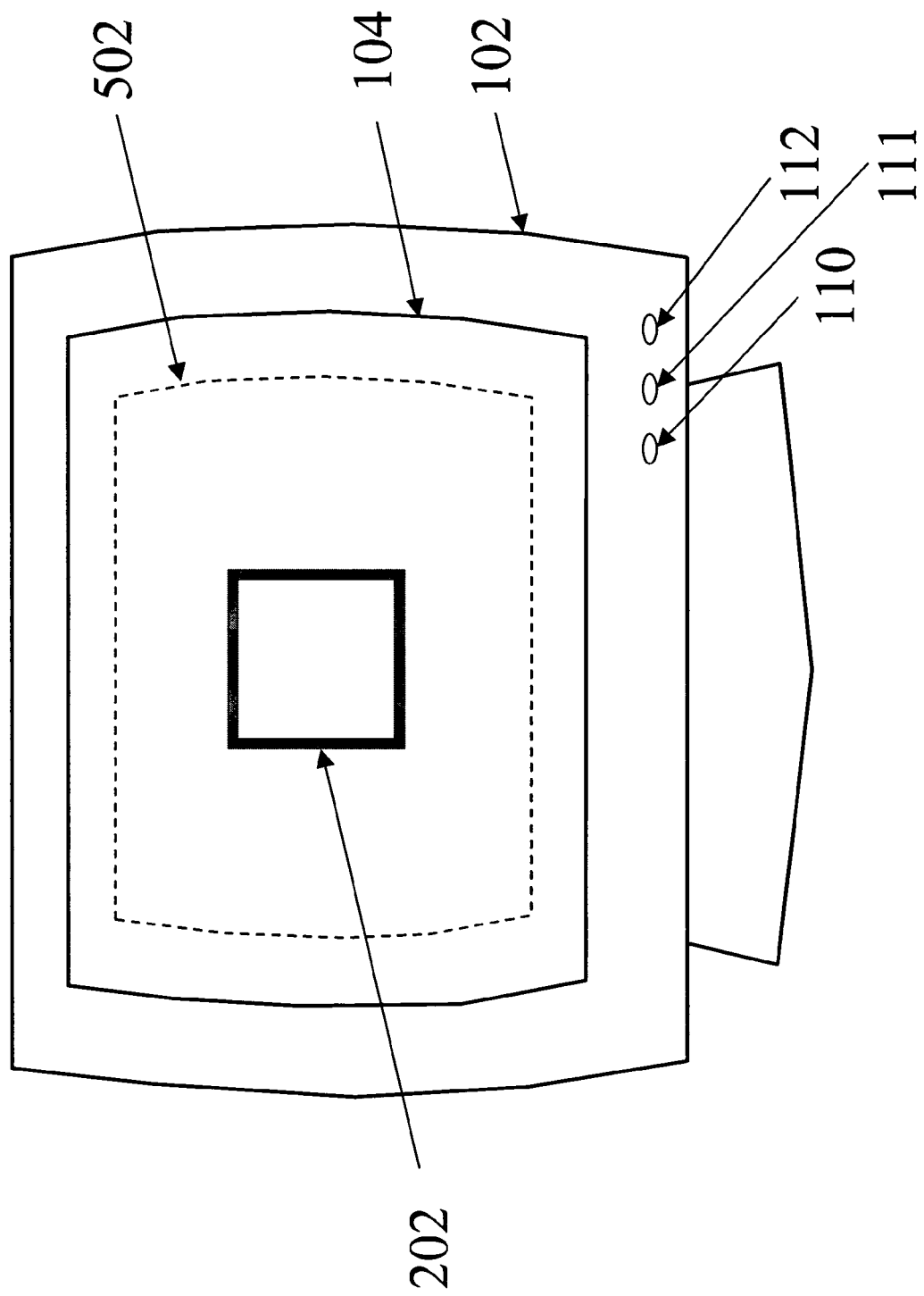
FIG. 10 illustrates an example monitor with a touch screen after active area of the monitor has been rescaled.

FIG. 10 illustrates an example monitor with a touch screen after active area of the monitor has been rescaled. After calibration, the touch screen image setting frame is removed and dashed line 502 now indicates both the monitor active area 106 and touch screen active area 108, which are now of identical dimensions and positioning. Therefore, the system will respond properly no matter where object 202 is touched.

Figure 11:
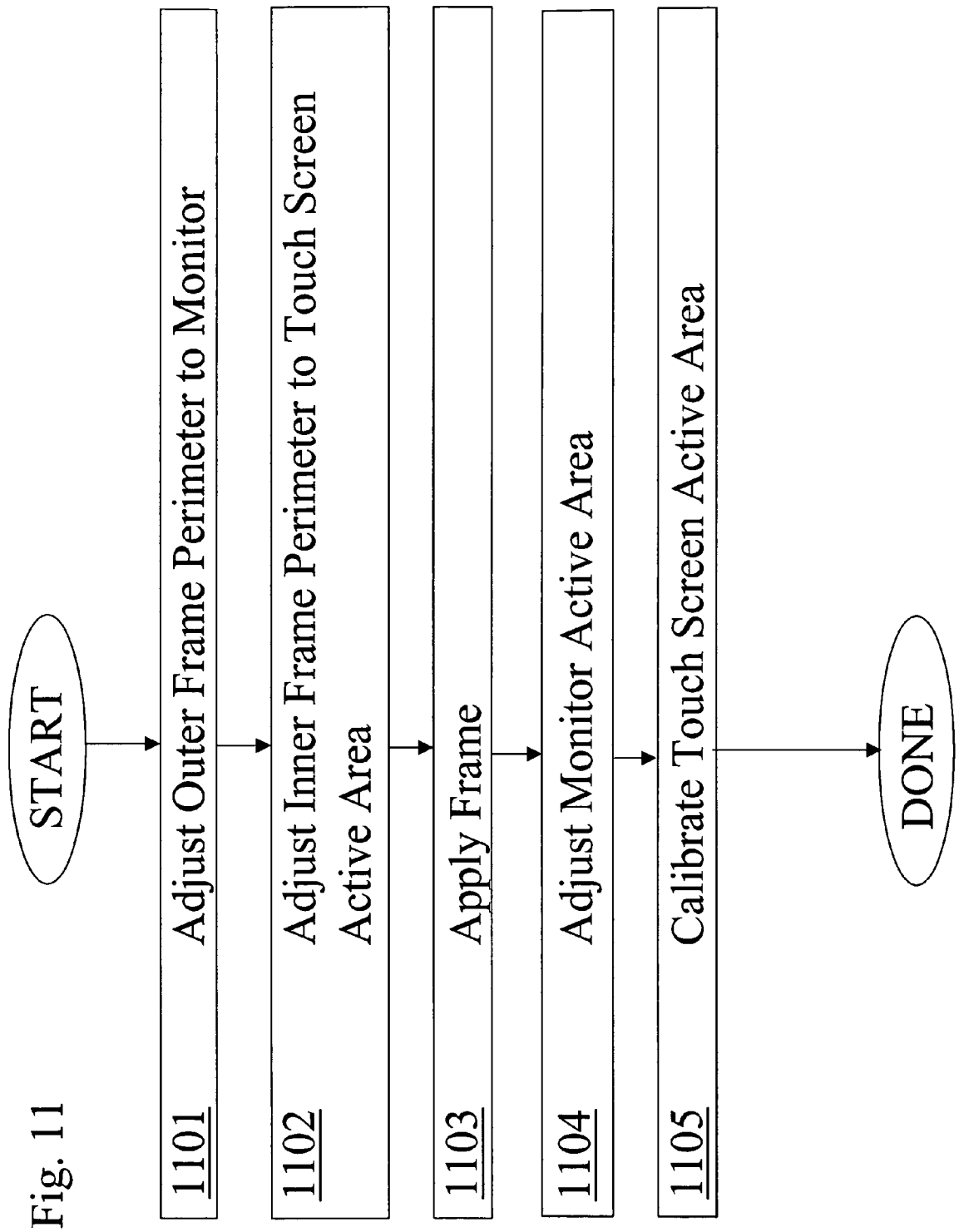
FIG. 11 illustrates an example method for rescaling the active area of a monitor having a touch screen, according to an example embodiment of the present invention.

FIG. 11 illustrates an example method for rescaling the active area of a monitor having a touch screen, according to an example embodiment of the present invention.

At 1101, the dimensions of the outer edge of the touch screen image setting frame may be adjusted to equal the dimensions of the monitor. At 1102 the dimensions of the inner edge of the touch screen image setting frame may be adjusted to equal the dimensions of the touch screen active area according to the manufacturer's specifications. Alternatively, the frame may be custom designed to possess the desired dimensions. The custom design is particularly useful when several identically designed machines are being serviced. The aspect ratio of the touch screen active area should be preserved in order to achieve the most accurate outcome.

At 1103, the touch screen image setting frame may be applied to the monitor. At this time, if any misalignment is noticed, the touch screen image setting frame may be adjusted further. As described above, the touch screen image setting frame may be temporarily adhered to some part of the monitor using any conventional mechanical or adhesive method.

At 1104, the dimensions of the size and position of the monitor active area may be adjusted to be equal to the dimensions of the size and position of the touch screen active area according to the inner edge of the touch screen image setting frame. This may be achieved using whatever method has been provided by the manufacturers of the device being used. For example, the buttons described above that are common on personal computers may be used, or any other conventional method for adjusted the size and position of the monitor active area may be used.

At 1105, the touch screen active area may be calibrated for position accuracy using conventional software. This also may be carried out using software and/or hardware provided by the manufacturer of the touch screen overlay device.

This method may be employed when touch screen overlays are first being installed in order to ensure the most accurate initial set up, as well as during routine maintenance.

Modifications

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

We claim:

1. A method of rescaling a monitor active area of a monitor having a touch screen overlay, comprising:
   placing a frame in front of the monitor;
   adjusting the dimensions of the monitor active area to be equal to the dimensions of an inner perimeter of the frame placed in front of the monitor, wherein the dimensions of the inner perimeter of the frame are about equal to the dimensions of a touch screen active area of the touch screen overlay; and
   after the adjusting, removing the frame from in front of the monitor.

2. The method of claim 1, wherein
   the inner perimeter defines an opening in the frame through which the monitor active area is at least partially visible, and wherein the frame further includes
   an outer perimeter disposed parallel to the inner perimeter, and
   at least one surface configured to conform to the surface of a monitor.

3. The method frame of claim 2, further comprising:
   adjusting the vertical and horizontal dimensions of the inner perimeter to be about equal to the vertical and horizontal dimensions of a touch screen active area of the touch screen overlay.

4. The method of claim 2, further comprising:
adjusting the vertical and horizontal dimensions of the outer perimeter of the frame to be equal to the vertical and horizontal dimensions of the monitor.

5. The method of claim 2, wherein the frame is opaque.

6. The method of claim 2, wherein the frame is at least partially translucent.

7. The method of claim 2, wherein the inner perimeter of the frame has the same aspect ratio as the touch screen active area.

8. The method of claim 2, further comprising:
prior to the adjusting of the dimensions of the monitor active area, temporarily mechanically securing the frame to the monitor.

9. The method of claim 8, wherein the frame is mechanically secured by at least one of pins, latches, and hook-and-latch fabric.

10. The method of claim 2, further comprising:
prior to adjusting the dimensions of the monitor active area, temporarily adhesively securing the frame to the front of the monitor.

11. The method of claim 10, wherein the frame includes an adhesive.

12. The method of claim 2, further comprising:
adjusting the distance between the inner perimeter and the outer perimeter.

13. The method of claim 2, wherein the frame includes frame members.

14. The method of claim 13, wherein at least one frame member of the frame is slidably attached to another frame member of the frame.

15. The method of claim 14, further comprising:
moving the at least one frame member relative to the another frame member by sliding the least one frame member of the frame along a track.

16. The method of claim 13, wherein the frame members include at least one of an at least partially flexible and an at least partially moldable component.

17. The method of claim 16, wherein at least one of the flexibility and moldability is dependent upon temperature.

18. The method of claim 2, wherein the frame includes at least two concentric detachably connected frame members, the method further comprising:
connecting the concentric detachably connected frame members together to reduce the dimensions of the inner perimeter; and
detaching the concentric detachably connected frame members to increase the dimensions of the inner perimeter.

19. The method of claim 2, wherein the frame includes at least two concentric detachably connected frame portions, the method further comprising:
connecting the concentric detachably connected frame members together to increase the dimensions of the outer perimeter;
and detaching the concentric detachably connected frame members to decrease the dimensions of the outer perimeter.

20. The method of claim 1, further comprising:
adjusting the dimensions of the inner perimeter of the frame to equal the dimensions of the touch screen active area.

21. The method of claim 1, further comprising:
adjusting the dimensions of an outer perimeter of the frame to equal the dimensions of the monitor.

22. The method of claim 1, further comprising:
adjusting the inner perimeter of the touch screen image setting frame to have the aspect ratio of the touch screen active area.

23. The method of claim 2, wherein the monitor is a gaming terminal monitor configured to display game play results to a game player and wherein the touch screen active area is configured to receive game play commands from the player.

24. A method of rescaling the monitor active area of a gaming terminal monitor having a touch screen overlay, comprising:
at least temporarily securing a touch screen image setting frame to the front of the gaming terminal monitor; wherein the touch screen image setting frame has an inner perimeter that defines an opening in the frame, an outer perimeter disposed parallel to the inner perimeter, at least one surface configured to conform to the surface of the gaming terminal monitor, and a device disposed on the frame and configured to at least temporarily secure the frame to the front of the gaming terminal monitor; and
adjusting the dimensions of the monitor active area of the gaming terminal monitor to equal the dimensions of the inner perimeter of the touch screen image setting frame; wherein the dimensions of the inner perimeter of the touch screen image setting frame are equal to the dimensions of a touch screen active area of the touch screen overlay; and
after the adjusting, removing the frame from in front of the monitor.

* * * * *